United States Patent
Liljedahl

(10) Patent No.: US 10,187,316 B2
(45) Date of Patent: Jan. 22, 2019

(54) DATA ITEM REPLAY PROTECTION

(71) Applicant: ARM LIMITED, Cambridge (GB)

(72) Inventor: Eric Ola Harald Liljedahl, Stockholm (SE)

(73) Assignee: ARM Limited, Cambridge (GB)

( * ) Notice: Subject to any disclaimer, the term of this patent is extended or adjusted under 35 U.S.C. 154(b) by 85 days.

(21) Appl. No.: 15/212,433

(22) Filed: Jul. 18, 2016

(65) Prior Publication Data
US 2018/0019951 A1 Jan. 18, 2018

(51) Int. Cl.
*H04L 12/801* (2013.01)
*H04L 12/823* (2013.01)

(52) U.S. Cl.
CPC .............. *H04L 47/34* (2013.01); *H04L 47/32* (2013.01)

(58) Field of Classification Search
CPC ....... H04L 9/00; H04L 12/56; H04L 63/1466; H04L 1/1832; H04L 63/164
See application file for complete search history.

(56) References Cited

U.S. PATENT DOCUMENTS

| | | | | |
|---|---|---|---|---|
| 7,990,861 B1* | 8/2011 | Jin | ........................ | H04L 1/1832 370/229 |
| 8,474,034 B2* | 6/2013 | Zhang | ................. | H04L 63/1466 380/44 |
| 2008/0295163 A1* | 11/2008 | Kang | ................... | H04L 63/164 726/13 |

* cited by examiner

*Primary Examiner* — Hanh N Nguyen
(74) *Attorney, Agent, or Firm* — Nixon & Vanderhye P.C.

(57) ABSTRACT

Apparatus and a corresponding method for processing a received data item comprising a received sequence number are provided. A set of sequence number entries are stored as an array and data item processing circuitry performs an access to only a selected entry in the array in dependence on the received sequence number. Each possible sequence number maps only to a single entry in the array. The access comprises performing an atomic check and update operation on a stored sequence number in the selected entry and the update comprises storing the received sequence number in the selected entry when the received sequence number is larger than the stored sequence number in the selected entry. Since only the selected entry in the array is accessed, the blocking of the array whilst the access is made is limited only to the selected entry and multiple concurrent accesses to the array can be made, allowing the process to readily scaled out to multiple parallel processes.

17 Claims, 6 Drawing Sheets

DATA ITEM REPLAY PROTECTION

TECHNICAL FIELD

The present disclosure relates to the reception of data items. More particularly, it relates to protecting against the replay of received data items, that is, where a given data item is received more than once when it should only be received once.

BACKGROUND

In a receiver which receives data items it may be necessary to ensure that an individual data item is only received once. As such the receiver may be provided with the capability to detect duplicate (also known as "replayed") data items, wherein the receiver makes reference to an identifier, such as a sequence number, associated with each data item, in order to determine if a newly received data item has in fact already been received by the receiver. In order to provide this functionality the receiver therefore needs to maintain a window of past sequence numbers against which a newly received sequence number can be checked.

SUMMARY

At least one example described herein provides apparatus comprising: data item reception circuitry to receive a data item comprising a sequence number; array storage circuitry to store as an array a set of sequence number entries; and data item processing circuitry to perform an access to only a selected entry in the array in dependence on the received sequence number, wherein each possible sequence number maps only to a single entry in the array, wherein the access comprises performing an atomic check and update operation on a stored sequence number in the selected entry, and wherein the update comprises storing the received sequence number in the selected entry when the received sequence number is larger than the stored sequence number in the selected entry.

At least one example described herein provides a method of processing a received data item comprising a received sequence number, the method comprising the steps of: storing as an array a set of sequence number entries; and performing an access to only a selected entry in the array in dependence on the received sequence number, wherein each possible sequence number maps only to a single entry in the array, wherein the access comprises performing an atomic check and update operation on a stored sequence number in the selected entry, and wherein the update comprises storing the received sequence number in the selected entry when the received sequence number is larger than the stored sequence number in the selected entry.

At least one example described herein provides apparatus comprising: means for receiving a data item comprising a sequence number; means for storing as an array a set of sequence number entries; and means for performing an access to only a selected entry in the array in dependence on the received sequence number, wherein each possible sequence number maps only to a single entry in the array, wherein the access comprises performing an atomic check and update operation on a stored sequence number in the selected entry, and wherein the update comprises storing the received sequence number in the selected entry when the received sequence number is larger than the stored sequence number in the selected entry.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

Figure 1:
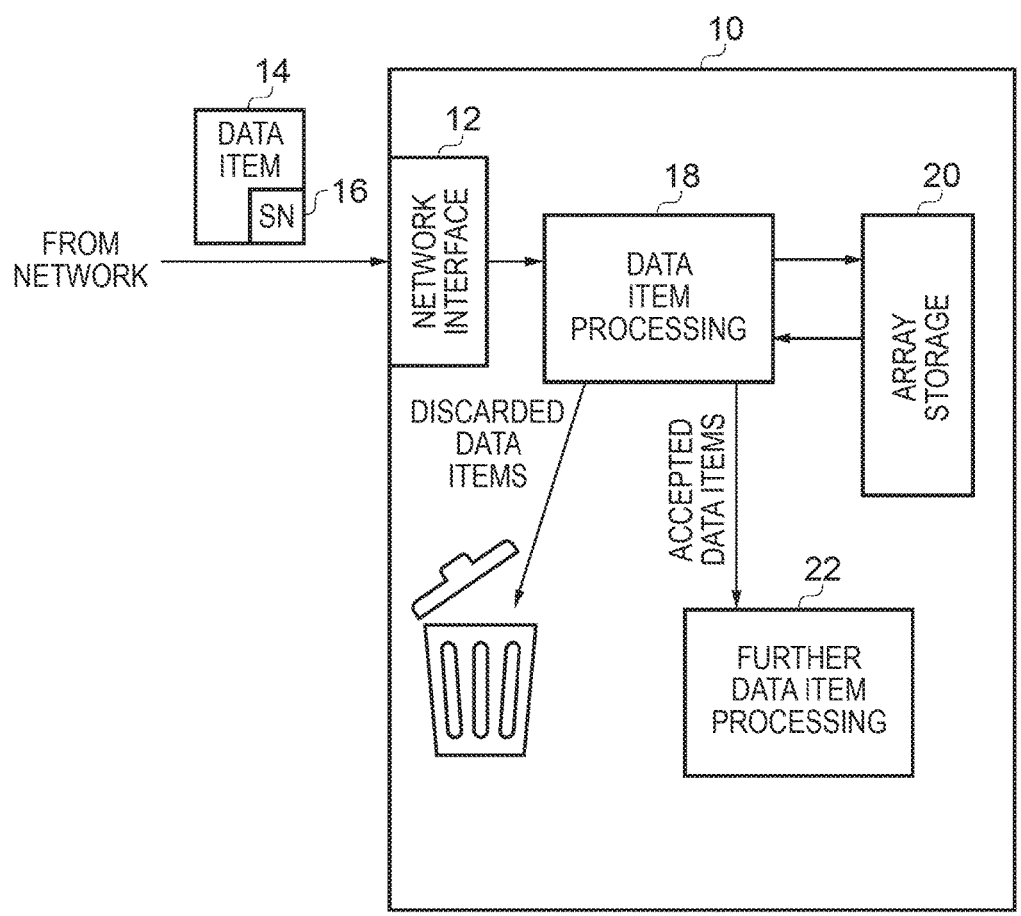
FIG. 1 schematically illustrates an apparatus in one embodiment comprising data item processing circuitry which accepts or discards received data items in dependence on a sequence number associated with each received data item.

At least one example described herein provides apparatus comprising: data reception circuitry to receive a data item comprising a sequence number; array storage circuitry to store as an array a set of sequence number entries; and data item processing circuitry to perform an access to only a selected entry in the array in dependence on the received sequence number, wherein each possible sequence number maps only to a single entry in the array, wherein the access comprises performing an atomic check and update operation on a stored sequence number in the selected entry, and wherein the update comprises storing the received sequence number in the selected entry when the received sequence number is larger than the stored sequence number in the selected entry.

In order for an apparatus which receives data items to determine if a sequence number associated with a given data item has previously been seen (and therefore if the data item itself has previously been seen), a window of past sequence numbers needs to be maintained, checked against and potentially updated. Moreover this administration of the window must be performed atomically to ensure that a correct status of the window is maintained. One approach to ensuring that the access to the window is correctly atomically performed could be to apply a lock-based approach, according to which the window is locked (blocking another access) whilst the access is made. However, the present techniques recognise that such a whole-window lock-based approach can soon become a bottleneck when frequent accesses to the window need to be made, one particular example of this being when the underlying processing is scaled out to multiple processing elements. Instead therefore the present techniques propose an approach to the administration of the window of past sequence numbers according to which a set of sequence number entries are stored in an array and, when an access to a selected entry of that array is made in dependence on a received sequence number, only the specific selected entry is accessed (and thus blocked to other accesses) thus allowing concurrent accesses to different parts of the array to be made and without resorting to locking the whole array on each access. Contention is therefore reduced and an essentially linear performance scaling to parallel processing can be implemented. The specific access made to the selected entry of the array is an atomic check and update operation, according to which a received sequence number is compared to the stored sequence number in the selected entry, with the larger of the two remaining in the selected entry after the access. Moreover, the present techniques recognise that this specific access represents the critical section of the process, in that it is unavoidable that only for a given selected entry only one received sequence number at a time can be compared against that selected entry, and therefore an approach is proposed in which this access is limited to the atomic check and update action, further supporting a configuration which allows efficient (and possibly concurrent) access to the array.

The maintenance in the array of the set of sequence number entries in this manner thus enables the apparatus to hold an up-to-date set of sequence number entries representing those data items which have been received within a window corresponding to the number of entries in the set. The apparatus may make further use of this set of sequence number entries in a variety of ways, but in some embodiments the data item processing circuitry comprises data item status determination circuitry to compare the stored sequence number and the received sequence number after the atomic check and update operation is complete, and to determine a status for the data item, wherein: the status is a pass status when the received sequence number is larger than the stored sequence number; and the status is a replay status when the received sequence number is equal to the stored sequence number, wherein data item status determination circuitry is responsive to the replay status to cause the received data item to be discarded. Accordingly, a status for the received data item can be determined on the basis of a comparison between the stored sequence number and the received sequence number, in particular allowing replayed data items to be identified where the received sequence number is equal to the (already) stored sequence number, i.e. where a previously received data item must have been received with that sequence number. The apparatus can then cause the replayed received data item to be discarded. Additionally, the approach of the present techniques provides that the determination of this status, on the basis of the comparison of the stored sequence number and the received sequence number, takes place after completion of the atomic check and update operation and therefore outside the above-mentioned "critical section". As a consequence this further supports a configuration allowing efficient (and possibly concurrent) access to the array.

In some embodiments the status is a stale status when the received sequence number is smaller than the stored sequence number, and the data item status determination circuitry is responsive to the stale status to cause the received data item to be discarded. Where the assumption is that the sequence numbers increase, it would generally be expected that (valid) received data items have sequence numbers greater than those previously seen (an eventual wraparound of the sequence number value at a very large maximum possible sequence number value notwithstanding). When the received sequence number is smaller than the stored sequence number, the present techniques therefore can take an approach which assumes that the received data item must be so old (due to an unusually long delay in transmission) that it cannot be treated as a validly received data item (since it has fallen outside the scope of the window represented by the array) and is therefore categorized as stale and is discarded.

As mentioned above, one context in which the present techniques find applicability is when the processing of data items is scaled out to multiple processing elements. Such multiple processing elements could take a variety of forms, but in some embodiments the data item processing circuitry is capable of executing multiple execution threads, wherein each execution thread of the multiple execution threads each performs an independent access to the array in response to reception of an allocated data item which has been allocated to that execution thread for processing, and wherein the array storage circuitry comprises shared storage which each execution thread accesses to perform the independent access to the array. Alternatively or in addition in some embodiments the apparatus comprises more than one data item processing circuitry each to execute at least one independent thread of the multiple execution threads.

The atomic check and update operation may be implemented in a variety of ways, for example using an atomic compare-and-swap operation (referred to as "compare-and-exchange" on an x86 architecture), a load-linked/store-conditional operation (referred to as a "load/store exclusive" on an ARM architecture), using a dedicated atomic fetch and max operation (for example as defined by the ARM v8.1 architecture), and so on. Further, in some embodiments the atomic check and update operation may be provided in a "far" implementation, allowing the operation to "skip" any cache levels solely associated with particular processing elements of the above-mentioned multiple processing elements, and for the sequence number array to be stored in a storage level shared by all of the multiple processing elements. Accordingly in some embodiments the apparatus further comprises: a private data store associated with each data item processing circuitry, and each data item processing circuitry is responsive to presence in its private data store of a copy of the stored sequence number in the selected entry, and when another data item processing circuitry seeks access to the selected entry, to cause the copy of the stored sequence number in the selected entry to be sent to the shared storage, and to cause the atomic check and update operation to be exported to and carried out on the shared storage instead of on the private data store. This further supports the scalability to multiple processing elements.

The private data store may for example be a cache memory.

Despite providing an approach which does not require the use of lock for the sequence number array, in some implementations of the present techniques a "partial lock" may be used to lock a smaller number of consecutive array elements, for example such as a lock per cache line which protects the entries located in the same cache line. Hence in some embodiments the shared storage comprises partial lock circuitry to set a lock value for a sub-portion of the array when one of the more than one data item processing circuitry is performing the independent access to the array, such that another data item processing circuitry cannot access the sub-portion of the array when the lock value is set.

Thus it should be recognised that the size of this partial lock may vary depending on the requirements of a particular implementation, but in some embodiments a size of the sub-portion of the array matches a cache line size of a private cache associated with each data item processing circuitry.

The present techniques recognise in addition that where access is made to a shared storage where the array is stored by multiple processes, and where some caching of the array occurs, a further possibility for contention to arise between those multiple processes can occur when those multiple processes seek simultaneously to update the same cache line (since more than one array entry may be stored in each cache line, even though they may are not seeking simultaneous access to the same array entry). To address this issue the present techniques propose that in some embodiments the data item processing circuitry comprises swizzling circuitry to reorder a set of lower order bits of the received sequence number, such that consecutive sequence numbers are stored in non-consecutive storage locations. This further means that these consecutive sequence numbers are then not held in the same cache line. The potential for contention between the multiple processes is thus reduced.

In some embodiments a size of the array is an integer power of two multiple of a cache line size of a private data store cache associated with each data item processing circuitry. This facilitates the implementation of the swizzeling.

The selected entry of the array may be selected in a variety of ways, but in some embodiments an index into the selected entry in the array is calculated as the received sequence number modulo a size of the array.

In some embodiments the apparatus is responsive to an initialization command to store invalid sequence numbers in the set of sequence number entries. This allows comparison of received sequence numbers against the content of the array to be performed directly after initialisation and without correct identification of the status of any arbitrary received sequence number only being possible after the array has been populated on the basis of an initial set of received sequence numbers (the status of which could not be correctly assessed). For example where zero is known to be an invalid sequence number for the expected data items, the initialisation can pre-set the set of sequence number entries in the array to be zero. This also means that the stored sequence numbers (zeroes) will be smaller than all valid sequence numbers, and thus a subsequently received data item with any valid sequence number will be treated as having a pass status (until the corresponding entry is updated to a non-zero value).

Nevertheless, the definition of the invalid sequence numbers may take a variety of forms and indeed the present techniques recognise that zero could be a valid sequence number. Accordingly in some embodiments a value of the selected entry in the array includes an offset. For example sequence numbers could be stored in the array offsetting by an offset K of +1. The atomic check and update operation can then operate on such offsetted values without other modification being required and the status determination for the sequence numbers can also operate on those offsetted values. It is further recognise that in consequence the K largest sequence numbers in this example then must be treated as invalid and cannot be stored in the array, but also that where the sequence numbers associated with the data items can typically be rather large (e.g. 64-bit) values this is very unlikely to occur and indeed that where a data item will typically also have an associated security (authentication), this would have expired long before these last few sequence numbers would be required. Moreover this situation can also be detected in advance and a normal rollover behaviour of the sequence numbers implemented beforehand to avoid this specific issue. The present techniques also envisage the possibility of using a negative offset value, which would allow a signed max operation to be used.

As mentioned above, a data item may have an associated validity (as is for example implemented by the authentication header in the Internet Protocol Security (IPsec) protocol suite for secure Internet Protocol (IP) communications). Efficient handling of received data items is proposed by, in some embodiments, the apparatus comprising data item authentication circuitry to determine a validity of the data item, and wherein the data item processing circuitry is responsive to the validity of the data item not to perform the access if the data item is invalid. In other words, the processing associated with the atomic check and update operation on the array (and indeed any further processing such as the operation of the data item status determination circuitry) is only invoked for data items which are determined to be valid.

The data item may take a variety of forms, but in some embodiments the data item is a data packet.

At least one example described herein provides a method of processing a received data item comprising a received sequence number, the method comprising the steps of: storing as an array a set of sequence number entries; and performing an access to only a selected entry in the array in dependence on the received sequence number, wherein each possible sequence number maps only to a single entry in the array, wherein the access comprises performing an atomic check and update operation on a stored sequence number in the selected entry, and wherein the update comprises storing the received sequence number in the selected entry when the received sequence number is larger than the stored sequence number in the selected entry.

At least one example described herein provides apparatus comprising: means for receiving a data item comprising a sequence number; means for storing as an array a set of sequence number entries; and means for performing an access to only a selected entry in the array in dependence on the received sequence number, wherein each possible sequence number maps only to a single entry in the array, wherein the access comprises performing an atomic check and update operation on a stored sequence number in the selected entry, and wherein the update comprises storing the received sequence number in the selected entry when the received sequence number is larger than the stored sequence number in the selected entry.

Some particular embodiments will now be described with reference to the figures.

FIG. 1 schematically illustrates an apparatus 10 in one embodiment. By means of its network interface circuitry 12 the apparatus 10 receives a data item 14 from the network to which it is connected. The data item 14 is labelled with a sequence number 16 which forms the basis of the processing performed according to the present techniques by the apparatus 10. As illustrated in FIG. 1, this data processing is performed by the data item processing circuitry 18 of the apparatus 10 with reference to the array storage circuitry 20, as will be described in more detail with reference to the figures which follow. The array storage circuitry holds a set of sequence number entries in an array, representing a past "window" of sequence numbers of data items which have already been received. On the basis of an atomic check and update operation which the data item processing circuitry 18 carries out with respect to a selected entry in the array, a data item is either discarded or is accepted for further data processing. Such further data processing may take a variety of forms and is schematically represented in FIG. 1 as being carried out by the further data item processing circuitry 22. It will be recognised by one of ordinary skill in the art that in fact the data item processing circuitry 18 and the further data item processing circuitry 22 may be provided by the same processing component of the apparatus 10, such as a CPU, and the illustration of FIG. 1 merely separates the two for clarity of explanation of the present techniques.

Figure 2A:
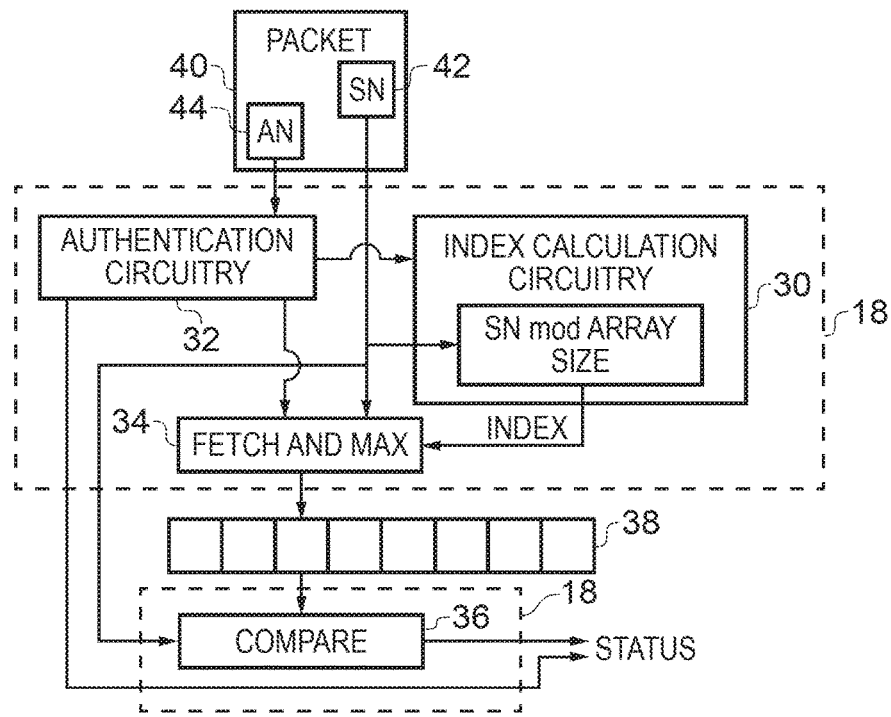
FIG. 2A schematically illustrates in more detail data item processing circuitry in one embodiment in which an atomic fetch and max operation is carried out on a sequence number array.

FIG. 2A schematically illustrates in more detail some components of an apparatus such as the apparatus 10 of FIG. 1 in one embodiment. The data item processing circuitry of FIG. 1 is represented in FIG. 2A by the components within the dashed boxes 18, namely the index calculation circuitry 30, the authentication circuitry 32, the fetch and max operation circuitry 34, and the comparison circuitry 36. It should be noted that there is no significance to the separation of the comparison 36 from the other components of the data item processing circuitry 18, and whilst this could in fact be a physical characteristic of the apparatus, this has rather been done in FIG. 2A merely for clarity of illustration of the dataflow. FIG. 2A shows an example in which a data packet 40 (which has been received by the data item reception circuitry of the apparatus, i.e. the network interface 12 shown in FIG. 1) has a sequence number 42 and an authentication number 44. It will be understood by one of ordinary skill in the art that these sequence and authentication numbers can be provided in an appropriate header of the data packet, such as for example in the authentication header (AH) of a data packet defined according to the Internet protocol Security (IPsec) protocol suite. The authentication circuitry 32 verifies that the data packet 40 is valid on the basis of its authentication number 44, and assuming that this is the case the remainder of the components operate as described below. However, in the event that the authentication circuitry 32 determines that the authentication number 44 of the packet 40 indicates that the data packet 40 is invalid, then the authentication circuitry 32 signals this invalidity to the index calculation circuitry 30, the fetch and max operation circuitry 34, and the comparison circuitry 36. As a consequence these components then do not perform any further data processing on this received data packet. In addition the authentication circuitry 32 provides a substitute status for this received data packet, indicating that it is invalid. This allows the invalid data items to be counted and/or logged.

Conversely, when the authentication circuitry 32 determines that the data packet 40 is valid on the basis of its authentication number 44, the index calculation circuitry 30 determines an index into the sequence number array 38 as the sequence number (SN) modulo the array size. This index is then passed to the fetch and max operation circuitry 34 which accesses the entry of the sequence number array identified by this index, performing the fetch and max operation on that selected entry. In other words the previously stored sequence number is fetched (returned) and the larger of the received sequence number and previously stored sequence number then remains in the selected entry after this operation. It should be noted that only the selected entry of the array is accessed by the fetch and max operation, meaning that the necessary atomicity of this operation does not block other processes from accessing other entries of the array simultaneously. Hence only the selected entry of the array itself is blocked for the short duration of this access, thus keeping very brief this "critical section" of the process (in the sense of its potential for restricting concurrent access). As shown in FIG. 2A, the received sequence number 42 and the fetched previously stored sequence number from the selected entry are then received by the comparison circuitry 36 after the atomic check and update operation is complete. The status of the data packet 40 is then determined on the basis of a comparison of these two values.

Figure 2B:
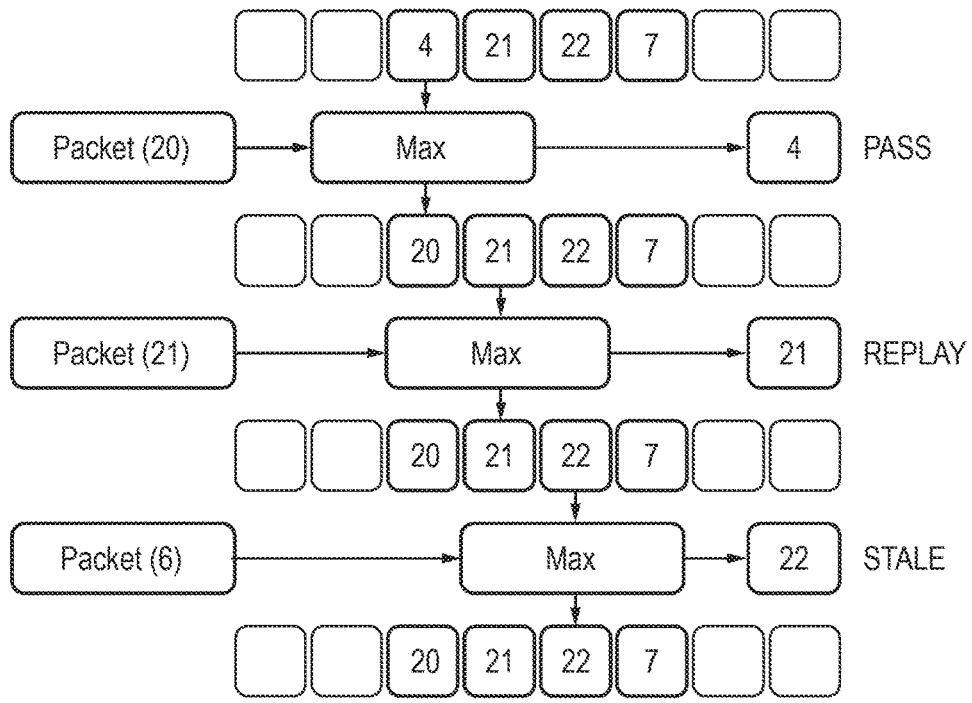
FIG. 2B shows three example data packets being received and the sequence number of each being used in an atomic fetch and max operation on a selected entry in a sequence number array to determine the status of each data packet.

The comparison of the two values to determine a data item status is illustrated by the examples given in FIG. 2B. For clarity of illustration only eight entries of the array are shown in FIG. 2B and moreover example sequence numbers held within only four of these eight entries are given. A first data packet is received with the sequence number value of 20. This sequence number thus determines the index into the array as described above (20 modulo [array size]) and the selected entry of the array is accessed, where a previously stored sequence number value of 4 is found. Being greater the received sequence number value of 20 then remains in this selected entry after completion of the fetch and max operation. Further, the subsequent comparison of the fetched previously stored sequence number value of 4 and the received sequence number value of 20 shows that the received sequence number is larger than the previously stored sequence number and therefore the status of this packet is determined to be a pass.

Next, a second data packet is received with the sequence number value of 21. A corresponding (different) selected entry of the array is then accessed, where a previously stored sequence number value of 21 is found. Being the same the previously stored sequence number value of 21 thus remains held in the selected entry after completion of the fetch and max operation. Further, the subsequent comparison of the fetched previously stored sequence number value of 21 and the received sequence number value of 21 shows that the received sequence number is the same as the previously stored sequence number and therefore the status of this packet is determined to be a replay. The packet is therefore then discarded.

Finally, a third data packet is received with the sequence number value of 6. A corresponding (again, different) selected entry of the array is then accessed, where a previously stored sequence number value of 22 is found. Being larger the received previously stored sequence number value of 22 thus remains held in the selected entry after completion of the fetch and max operation. Further, the subsequent comparison of the fetched previously stored sequence number value of 22 and the received sequence number value of six shows that the received sequence number is less than the previously stored sequence number and therefore the status of this packet is determined to be stale. The packet is therefore then discarded.

Figure 3A:
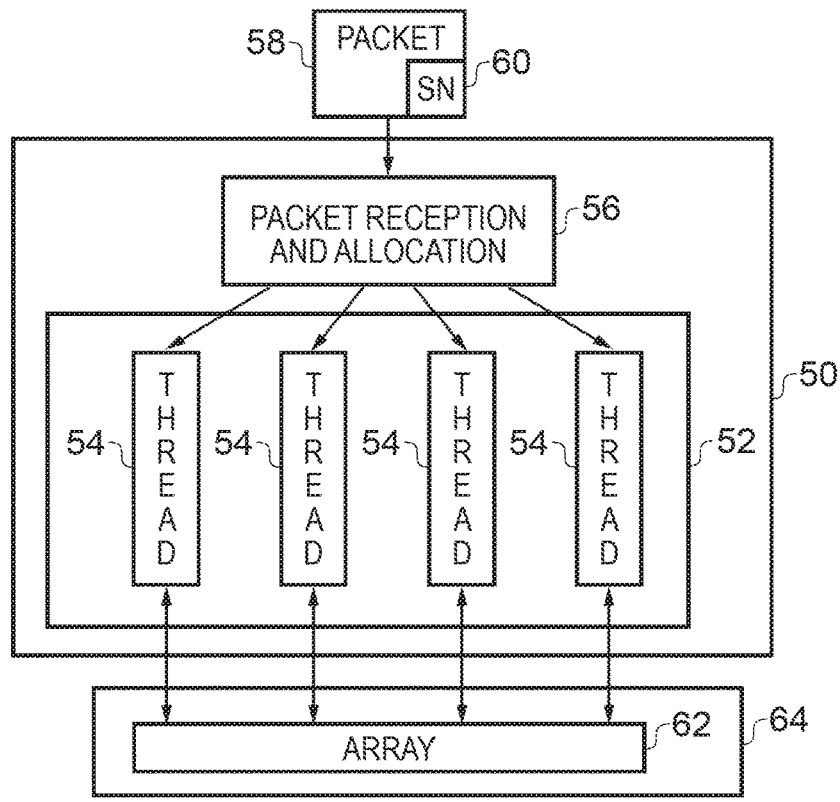
FIG. 3A schematically illustrates data item processing circuitry in one embodiment in which the data item processing circuitry is capable of executing multiple execution threads in parallel, wherein each execution thread can separately access a sequence number array.

FIG. 3A schematically illustrates an apparatus 50 in one embodiment in which the data item processing circuitry 52 is capable of executing several threads 54 in parallel. As an example, four threads 54 are shown in FIG. 3A. The apparatus 50 further comprises packet reception and allocation circuitry 56 which, in a manner with which one of ordinary skill in the art will be familiar, receives a data packet 58 from the network having a sequence number 60 and allocates this data packet 58 for processing by a given thread 54 of the data item processing circuitry 52 (i.e. to determine a status of the data packet 58 on the basis of its sequence number 60 by comparison to the array). As shown in FIG. 3A, each thread 54 can access the array 62 held in the array storage circuitry 64 in parallel. This is in particular possible according to the present techniques due to the fact that each thread only requires access to one selected entry of the array and therefore contention between the threads 54 for access to the array 62 is unlikely. Accordingly, the apparatus 50 is therefore able to determine data packet statuses at a rate which is, at least to a first approximation, four times faster than a multi-threaded apparatus which locks access to the entire array during access by each thread.

Figure 3B:
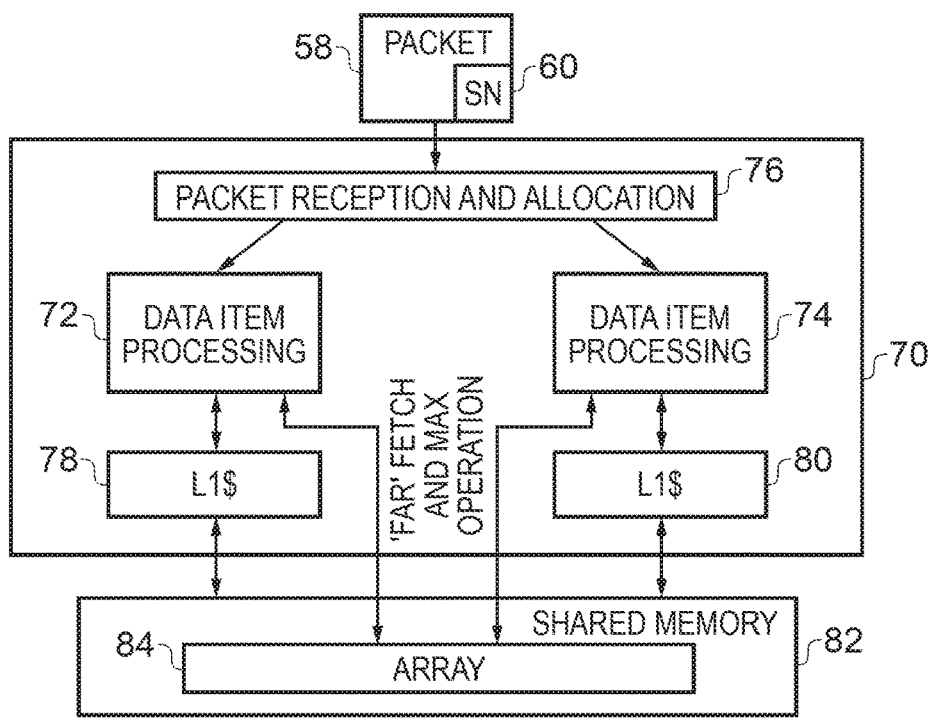
FIG. 3B schematically illustrates an apparatus in one embodiment comprising multiple data item processing circuitry, wherein each data item processing circuitry can separately access a shared sequence number array.

FIG. 3B schematically illustrates an analogous apparatus 70 in which the parallel processing capability is provided by multiple data item processing circuitry 72, 74 which operate in parallel with one another. As an simple example two data item processing circuitries 72 and 24 are shown in FIG. 3B, but more could also be present. The apparatus 70 further comprises packet reception and allocation circuitry 76 which, in a manner with which one of ordinary skill in the art will be familiar, receives the data packet 58 from the network having the sequence number 60 and allocates this data packet 58 for processing by a given data item processing circuitry. Each data item processing circuitry 72, 74 has an associated level 1 cache 78, 80 respectively, to reduce the latency associated with a memory access to the shared memory 82 in which the array 84 is actually stored. In operation, if an array entry has already been brought into the L1 cache 78, 80, then the data processing circuitry associated with that L1 cache accesses the entry in that cache. If the operation had been defined as a "far" fetch and max operation, then this degenerates into a normal ("near") operation. Otherwise, (when the operation is defined as a "far" fetch and max operation) the operation is "exported" to be carried out on the selected entry of the array 84 in the shared memory 82. If it is found that a copy of the selected entry of the array to which the data item processing circuitry 72, 74 requires access is stored in the level 1 cache 78, 80 belonging to the other data item processing circuitry, then that copy is brought into the shared memory 82, where the fetch and max operation (when defined as a "far" fetch and max operation) is carried out.

Figure 4A:
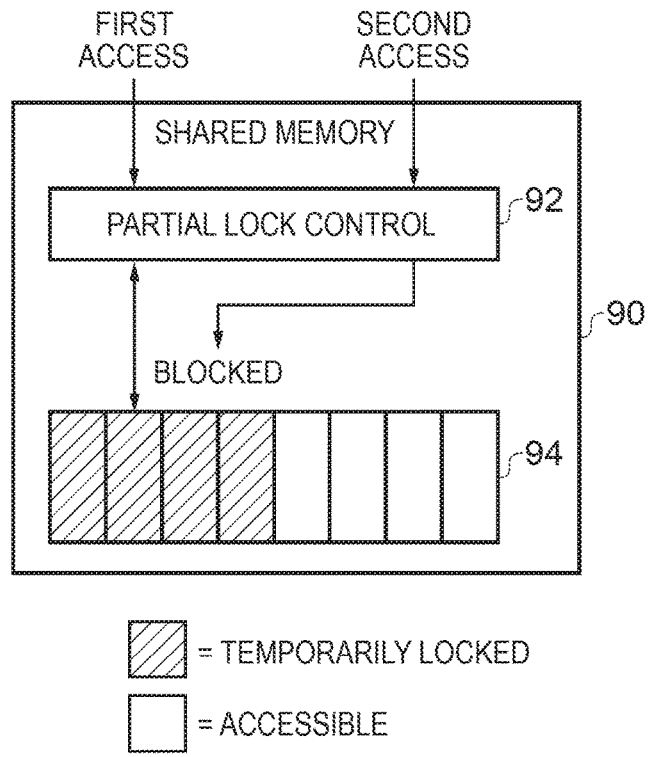
FIG. 4A schematically illustrates partial lock control circuitry temporarily applying a lock to a sub-portion of a sequence number array in one embodiment, such that a second access to that sub-portion cannot be made whilst a first access is ongoing.

FIG. 4A schematically illustrates a shared memory 90 in one embodiment which comprises partial lock control circuitry 92. In operation when a first access is received (to carry out a fetch and max operation), the partial lock control circuitry 92 of the shared memory 90 allows the first access to access a selected entry within the array 94, and applies a partial lock to this selected entry and a number of further adjacent entries (though not all) of the array. When a second access is received seeking to carry out a fetch and max operation on a different selected entry within an array 94, though nevertheless within the group of entries to which access by the partial lock control circuitry has been temporarily locked, this second access is blocked until the first access is complete.

Figure 4B:
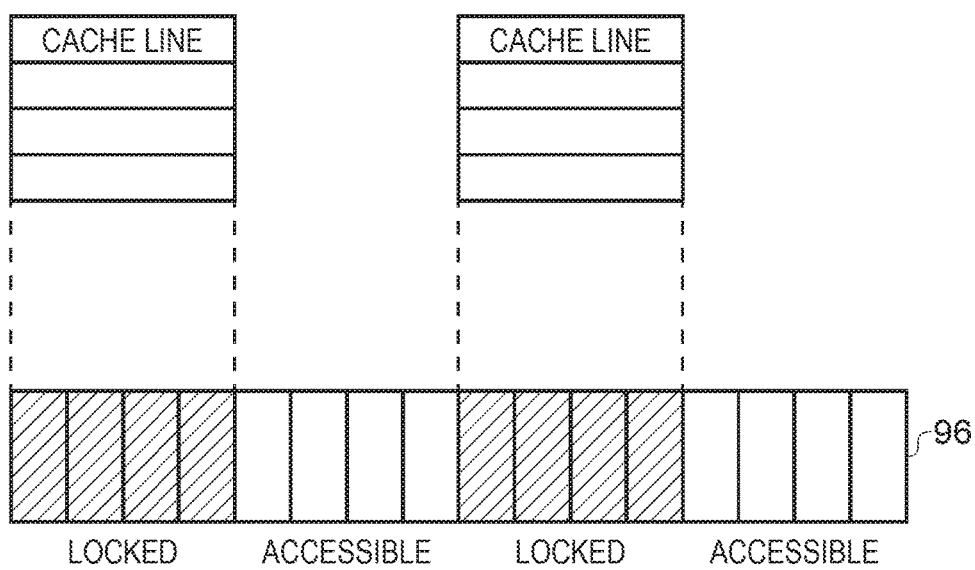
FIG. 4B schematically illustrates a correspondence between private cache line sizes and locked portions of a sequence number array in one embodiment.

FIG. 4B shows an example of the sub-regions of the array 96 which are temporarily locked by partial lock control circuitry in one example and in particular that the size of these sub-regions corresponds to a cache line size. Where these cache line sizes represent the sizes of cache line within a shared cache used by multiple threads and/or data item processing circuitries, and the array itself is stored within this shared cache, this means that the atomicity of an access to a data item stored in the shared cache can be ensured by preventing another concurrent (or very closely following access) from simultaneously accessing the same cache line.

Figure 5A:
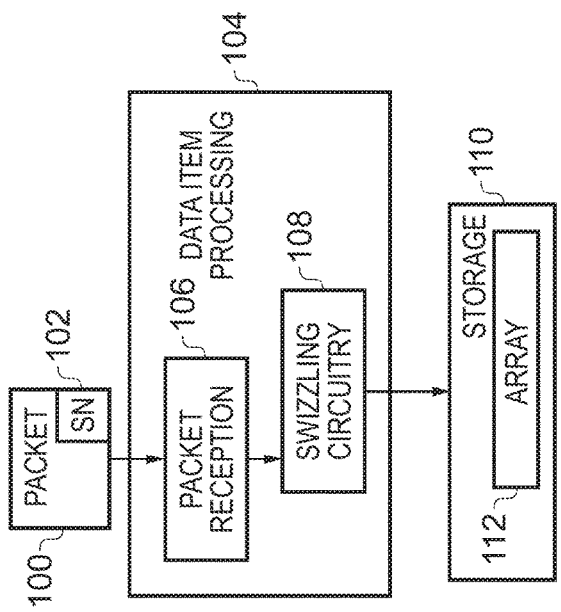
FIG. 5A schematically illustrates data item processing circuitry comprising swizzling circuitry in one embodiment.
Figure 5B:
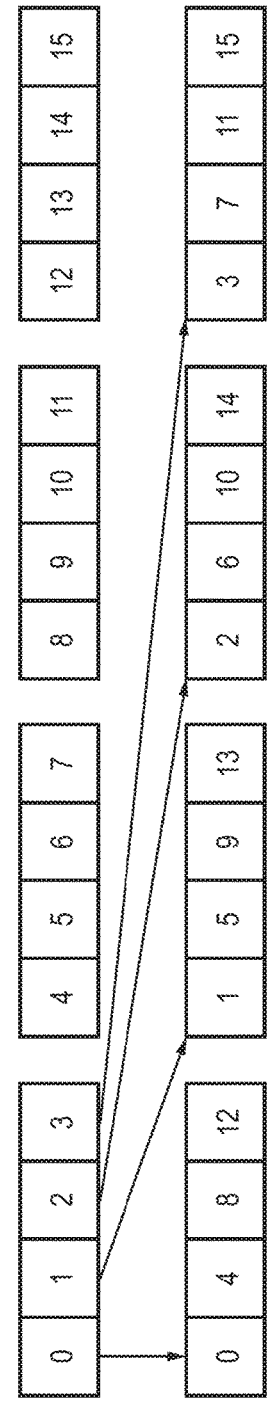
FIG. 5B shows an example of storage location mappings which can be provided by the swizzling circuitry of FIG. 5A.

FIG. 5A schematically illustrates some (though it will be appreciated not all) components of an apparatus in one embodiment, where a packet 100 comprising a sequence number 12 is received by the data item processing circuitry 104 and in particular firstly by packet reception circuitry 106 thereof. When the sequence number 102 of the packet 100 is processed to access a selected entry in the array 112 stored in the storage 110, once the selected entry is determined by a process which additionally reorders a set of lower order bits of the received sequence number. This is carried out by the swizzling circuitry 108. The effect is that consecutive sequence numbers are stored in non-consecutive storage locations (i.e. entries within the array). One example swizzling mapping is shown in FIG. 5B, with an example set of 16 sequence numbers in the upper row of the figure being mapped to an example set of 16 storage locations (array entries). Taking an example where four array entries can be stored in a cache line, this approach means that for consecutive sequence numbers are mapped out to four different cache lines, and issues relating to mutual blocking when the data item status identification is carried out by for parallel processes (e.g. by four parallel threads) which seek access to the same cache line are avoided.

Figure 6:
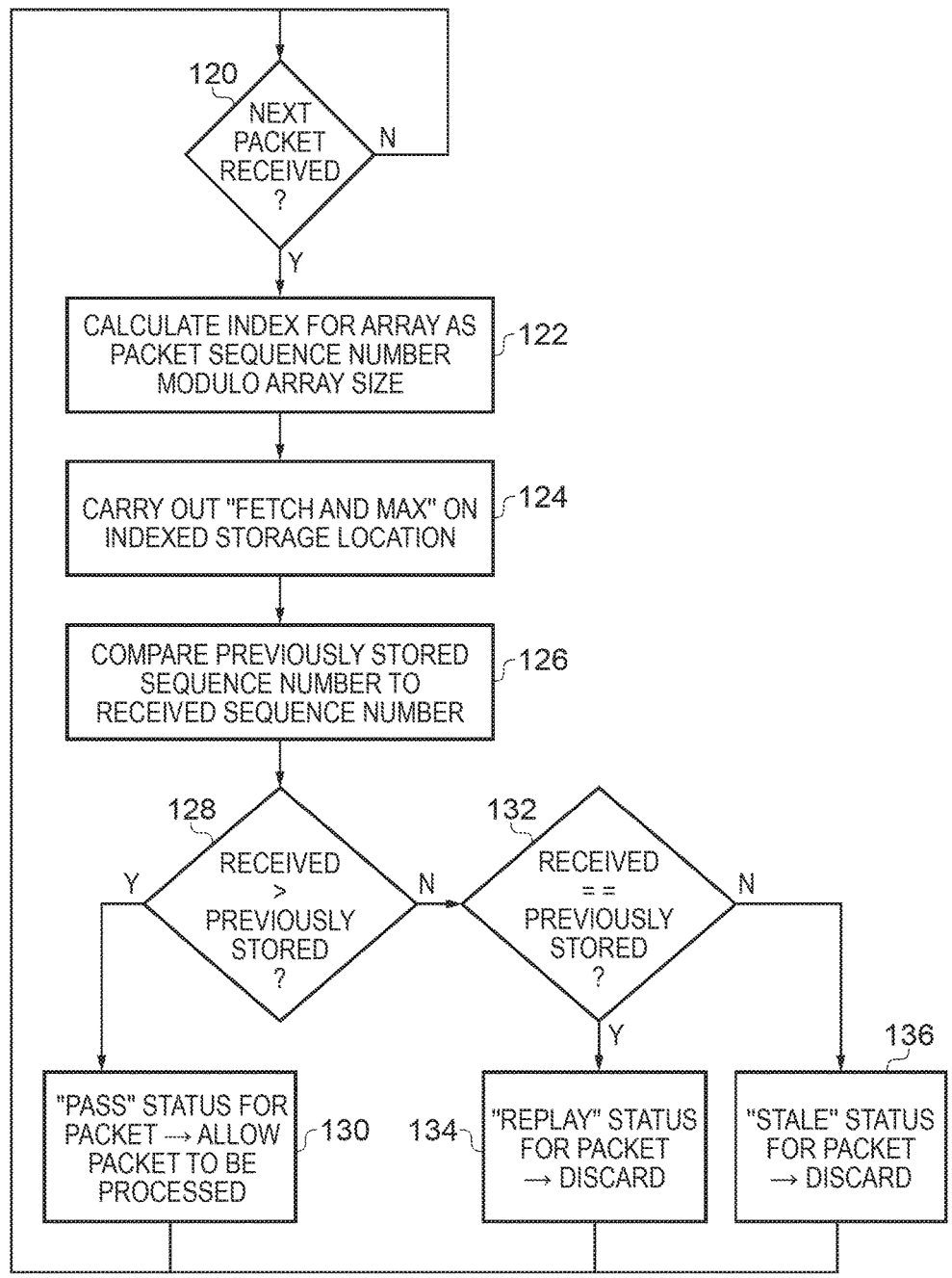
FIG. 6 shows a sequence of steps which are taken according to the method of one embodiment.

FIG. 6 shows a sequence of steps which are carried out in one example of the method of the present techniques. The flow can is considered to begin at step 120, where it is determined if a next data packet has been received. When it is then the flow proceeds to step 122, where an index into the array is calculated as the packet sequence number modulo the array size. Then at step 124 a fetch and max operation is carried out on the index storage location (i.e. on an entry in the array identified by the calculated index). The larger of the previously stored sequence number in this entry and the received sequence number then remains in this entry. Then at step 126 the previously stored sequence number is compared to the received sequence number and at step 128 it is determined if the received sequence number is greater than the previously stored sequence number. If this is the case then the flow proceeds to step 130, where a pass status for the packet is generated and it is allowed to be processed further. The flow then returns to step 120. If however at step 128 it is determined that the received sequence number is not greater than the previously stored sequence number then the flow proceeds to step 132, where it is determined if the received sequence number is equal to the previously stored sequence number. If this is the case then the flow proceeds to step 134, where a replay status for the packet is generated and the packet is discarded. Alternatively if at step 132 it is determined that the received sequence number is not equal to the previously stored sequence number, then the received sequence number must be less than the previously stored sequence number and the flow proceeds to step 136, where a stale status of the packet is generated and the packet is discarded. From either step 134 or step 136 the flow returns to step 120.

In brief overall summary an apparatus and a corresponding method for processing a received data item comprising a received sequence number are provided. A set of sequence number entries are stored as an array and data item processing circuitry performs an access to only a selected entry in the array in dependence on the received sequence number. Each possible sequence number maps only to a single entry in the array. The access comprises performing an atomic check and update operation on a stored sequence number in the selected entry and the update comprises storing the received sequence number in the selected entry when the received sequence number is larger than the stored sequence number in the selected entry. Since only the selected entry in the array is accessed, the blocking of the array whilst the access is made is limited only to the selected entry and multiple concurrent accesses to the array can be made, allowing the process to readily scaled out to multiple parallel processes.

In the present application, the words "configured to . . ." or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. Apparatus comprising:
    data item reception circuitry to receive a data item comprising a sequence number;
    array storage circuitry to store as an array a set of sequence number entries; and
    data item processing circuitry to perform an access to only a selected entry in the array in dependence on the received sequence number, wherein each possible sequence number maps only to a single entry in the array,
    wherein the access comprises performing an atomic check and update operation on a stored sequence number in the selected entry, and wherein the update comprises storing the received sequence number in the selected entry when the received sequence number is larger than the stored sequence number in the selected entry,
    wherein the data item processing circuitry is capable of executing multiple execution threads, wherein each execution thread of the multiple execution threads each performs an independent access to the array in response to reception of an allocated data item which has been allocated that execution thread for processing, and
    wherein the array storage circuitry comprises shared storage which each execution thread accesses to perform the independent access to the array.

2. The apparatus as claimed in claim 1, wherein the data item processing circuitry comprises data item status determination circuitry to compare the stored sequence number and the received sequence number after the atomic check and update operation is complete, and to determine a status for the data item, wherein:
    the status is a pass status when the received sequence number is larger than the stored sequence number; and
    the status is a replay status when the received sequence number is equal to the stored sequence number, wherein data item status determination circuitry is responsive to the replay status to cause the received data item to be discarded.

3. The apparatus as claimed in claim 2, wherein the status is a stale status when the received sequence number is smaller than the stored sequence number, and the data item status determination circuitry is responsive to the stale status to cause the received data item to be discarded.

4. The apparatus as claimed in claim 1, comprising:
    more than one data item processing circuitry each to execute at least one independent thread of the multiple execution threads.

5. The apparatus as claimed in claim 4, further comprising:
    a private data store associated with each data item processing circuitry,
    and each data item processing circuitry is responsive to presence in its private data store of a copy of the stored sequence number in the selected entry, and when another data item processing circuitry seeks access to the selected entry, to cause the copy of the stored sequence number in the selected entry to be sent to the shared storage, and to cause the atomic check and update operation to be exported to and carried out on the shared storage instead of on the private data store.

6. The apparatus as claimed in claim 5, wherein the private data store is a cache memory.

7. The apparatus as claimed in claim 1, wherein the shared storage comprises partial lock circuitry to set a lock value for a sub-portion of the array when one of the more than one data item processing circuitry is performing the independent access to the array, such that another data item processing circuitry cannot access the sub-portion of the array when the lock value is set.

8. The apparatus as claimed in claim 7, wherein a size of the sub-portion of the array matches a cache line size of a private cache associated with each data item processing circuitry.

9. The apparatus as claimed in claim 1, wherein the data item processing circuitry comprises swizzling circuitry to reorder a set of lower order bits of the received sequence number, such that consecutive sequence numbers are stored in non-consecutive storage locations.

10. The apparatus as claimed in claim 9, wherein a size of the array is an integer power of two multiple of a cache line size of a private data store cache associated with each data item processing circuitry.

11. The apparatus as claimed in claim 1, wherein an index into the selected entry in the array is calculated as the received sequence number modulo a size of the array.

12. The apparatus as claimed in claim 1, wherein the apparatus is responsive to an initialization command to store invalid sequence numbers in the set of sequence number entries.

13. The apparatus as claimed in claim 1, wherein a value of the selected entry in the array includes an offset.

14. The apparatus as claimed in claim 1, comprising data item authentication circuitry to determine a validity of the data item, and wherein the data item processing circuitry is responsive to the validity of the data item not to perform the access when the data item is invalid.

15. The apparatus as claimed in claim 1, wherein the data item is a data packet.

16. A method comprising the steps of:
    receiving by a receiver a data item comprising a received sequence number;
    storing in a memory a set of sequence number entries as an array; and
    performing, by data item processing circuitry, an access to only a selected entry in the array in dependence on the received sequence number, wherein each possible sequence number maps only to a single entry in the array, wherein the access comprises the data item processing circuitry performing an atomic check and update operation on a stored sequence number in the selected entry, and wherein the update comprises the data item processing circuitry storing the received sequence number in the selected entry in the array when the received sequence number is larger than the stored sequence number in the selected entry in the array, wherein the data item processing circuitry executes multiple execution threads, wherein each execution thread of the multiple execution threads each performs an independent access to the array in response to reception of an allocated data item which has been allocated that execution thread for processing, and wherein the array storage circuitry comprises shared storage which each execution thread accesses to perform the independent access to the array.

17. Apparatus comprising:

means for receiving a data item comprising a sequence number;

means for storing as an array a set of sequence number entries; and means for performing an access to only a selected entry in the array in dependence on the received sequence number, wherein each possible sequence number maps only to a single entry in the array, wherein the access comprises performing an atomic check and update operation on a stored sequence number in the selected entry, and wherein the update comprises storing the received sequence number in the selected entry when the received sequence number is larger than the stored sequence number in the selected entry wherein the means for performing is capable of executing multiple execution threads, wherein each execution thread of the multiple execution threads each performs an independent access to the array in response to reception of an allocated data item which has been allocated that execution thread for processing, and wherein the means for storing comprises shared storage which each execution thread accesses to perform the independent access to the array.

* * * * *